United States Patent [19]

Shervington et al.

[11] Patent Number: 5,017,821
[45] Date of Patent: May 21, 1991

[54] BRUSHLESS DYNAMO ELECTRIC MACHINE WITH ACCESS TO RECTIFIER ASSEMBLY

[75] Inventors: Roger M. Shervington; Roy D. Rasmussen; Jeff A. Stadler, all of Rockford, Ill.

[73] Assignee: Sundstrand Corporation, Rockford, Ill.

[21] Appl. No.: 313,875

[22] Filed: Feb. 23, 1989

[51] Int. Cl.$^5$ .............. H02K 11/00; H02K 5/04; H02K 5/15; H02K 9/16

[52] U.S. Cl. .................. 310/68 D; 310/89; 310/71; 310/52; 310/61

[58] Field of Search .............. 310/52, 54, 60 A, 61, 310/68 D, 71, 89, 112, 113, 114

[56] References Cited

U.S. PATENT DOCUMENTS

| | | |
|---|---|---|
| 2,722,652 | 11/1955 | Brainard . |
| 2,897,383 | 7/1959 | Barrows et al. ............... 310/68 D |
| 3,562,564 | 2/1971 | Potter ................................. 310/54 |
| 3,629,627 | 12/1971 | Dafler ................................. 310/54 |
| 3,829,725 | 8/1974 | Petersen et al. ............. 310/68 D |
| 3,858,069 | 12/1974 | Kuter et al. ................... 310/68 D |
| 3,965,379 | 6/1976 | Meusel et al. ................. 310/68 R |
| 4,161,668 | 7/1979 | Schombe et al. ............. 310/68 D |
| 4,329,603 | 5/1982 | Ballard ............................. 310/61 |
| 4,603,344 | 7/1986 | Trommer ....................... 310/68 D |
| 4,628,219 | 12/1986 | Troscinski ..................... 310/68 D |
| 4,745,315 | 5/1988 | Terry, Jr. et al. ................ 310/61 |
| 4,794,510 | 12/1988 | Wege ............................. 310/68 D |
| 4,827,165 | 5/1989 | Nold ............................... 310/68 D |

*Primary Examiner*—Steven L. Stephan
*Assistant Examiner*—C. LaBalle
*Attorney, Agent, or Firm*—Antonelli, Terry, Stout & Kraus

[57] ABSTRACT

To replace a diode assembly in a brushless dynamo electric machine without removal of the rotor or separation of the housing along a split line, a sealed cap is located at a position near the end of the hollow rotor. The parts for maintaining the diode housing in operation position can all be slidably removed for permitting each removal and replacement of the diode housing.

12 Claims, 4 Drawing Sheets

BRUSHLESS DYNAMO ELECTRIC MACHINE WITH ACCESS TO RECTIFIER ASSEMBLY

DESCRIPTION

1. Technical Field

This invention relates to brushless dynamo electric machines commonly used as generators which have a common rotor shaft for an exciter unit and a main generator unit where the rotors are electrically interconnected by a rectifier assembly. More particularly, this invention relates to a novel structure allowing easy access to the rectifier assembly for its removal or exchange without the need for splitting the housing or removing the rotor.

2. Background Art

Brushless generators are conventionally formed of a permanent magnet generator, an exciter, and a main generator. Typically, relatively low levels of power are generated by the permanent magnet generator which is made up of a permanent magnet field carried by a generator rotor and which induces electrical energy in a stationary generator output winding. The power from this winding is rectified and subjected to known control parameters before being fed to a stationary field winding of the exciter. The exciter includes an output winding carried by the rotor and as the same rotates within the magnetic field generated by the exciter field winding, electrical energy is induced in the exciter output winding. This energy will be an alternating current, not untypically, will be three phase.

The resulting alternating current is rectified by means of a rectifier carried within the rotor and rotating therewith as shown for example, in U.S. Pat. Nos. 4,621,210 granted Nov. 4, 1986 and 4,329,603 granted May 11, 1982. The rectified direct current is supplied to the main field winding of the main generator. The main field winding, being carried by the rotor and when energized with direct current and when rotated, provides a rotating magnetic field which in turn induces an alternating current in a stationary main armature output winding. Power thus generated may be taken from the stationary main armature output winding to a point of use by a system that is operative without need for the presence of brushes, slip rings or commutators. In aircraft power generating applications, the generators may be coupled mechanically to the aircraft engine. In the case of jet engines, the coupling is frequently in the engine gearbox with the generating system being housed in the same cowling as the engine itself.

The rotating rectifier consists of individual diodes and interconnecting wires from the exciter rotor armature and to the D.C. main field which is mounted on the rotor shaft. During operation, the electrical losses in the rectifier diodes are dissipated as heat which must be carried away to prevent over temperature and resulting failure of diodes.

A problem has existed because of a servicing requirement which calls for withdrawal or exchange of rectifier units from time to time. Such rectifier withdrawal in the past has required the housing parts to be split along a split line and the rotor removed to allow the rectifier assembly to be withdrawn from the interior of the hollow rotor shaft for exchange. Such a procedure is time consuming. Since the rectifier assembly is one of the more vulnerable components in the integrated drive generator which may be of the general type shown in U.S. Pat. No. 4,609,842 granted Sept. 2, 1986, the procedure is one which is required from time to time.

DISCLOSURE OF INVENTION

A major object of the present invention is to provide a novel structure allowing the rectifier assembly to be removed from the interior of the rotor shaft without splitting the dynamo housing and without removal of the rotor shaft.

A further object is to provide a novel sealed cover which is removable from the dynamo housing at a position near the rectifier assembly so that access is available through an open end of the hollow rotor shaft.

Another object of the invention is to provide an arrangement for the wiring of the exciter unit armature to extend through an open end of the hollow rotor shaft to a terminal connector on the rectifier assembly which is easily accessible through the removable cap. When removal of the rectifier assembly is desired, the exciter wire terminal can first be removed totally from a position inside the hollow rotor without cutting or destroying the wire.

A yet further object of the invention is to provide an assembly of parts all of which are insertable through the exposed end of the hollow rotor which includes diode housing for the rectifier assembly together with means engaged with the open end of the rotor shaft for securing the diode housing against axial movement along the rotor shaft. As a further feature, ducting is provided for supplying coolant to the diodes in the diode housing through end walls that allow a flow of coolant in the direction of the rotor axis.

These and other objects of the invention will become more fully apparent from the claims, and from the description as it proceeds in connection with the drawings.

BEST MODE FOR CARRYING OUT THE INVENTION

Figure 1:
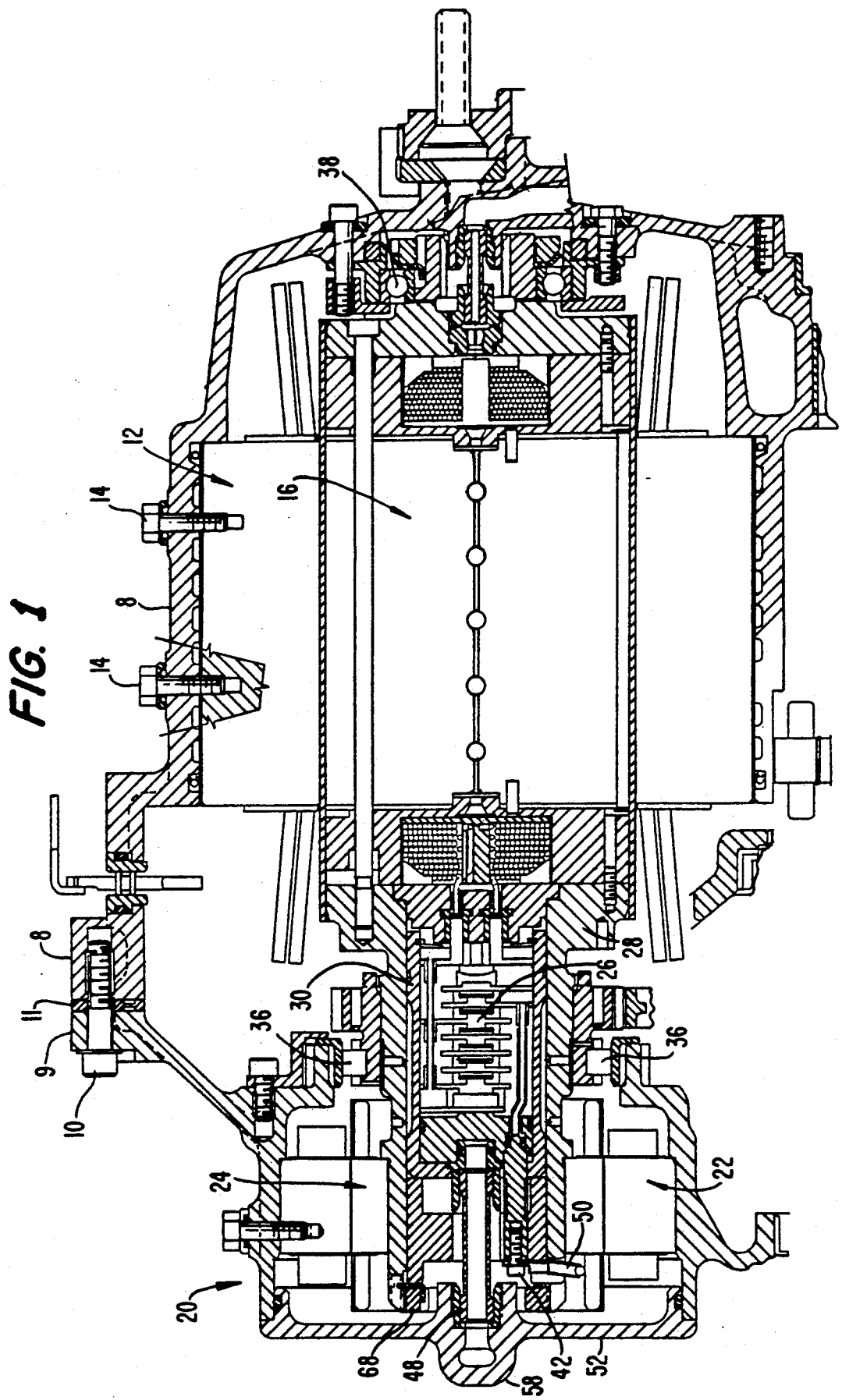
FIG. 1 is a view in section of a portion of an integrated drive generator in which the present invention has been incorporated.

An integrated drive generator as illustrated in the drawings is connected to be driven by a prime mover through a transmission (not shown) that maintains the rotor speed constant during normal operation of an aircraft over a wide range of engine speeds. The integrated drive generator housing traditionally is formed of pieces including those shown at 8 and 9 that are held together by bolts 10 along a break line at 11.

The main generator armature 12 which supplies current to the utilization circuit is conventionally mounted to the housing part 8 as by threaded fasteners 14. The rotationally mounted main generator field winding 16 is supplied with current from an exciter 20 having a stationary field winding 22 and a rotating armature 24. The output of the exciter armature 24 is connected to diodes 26 which are part of the rectifier assembly and thereby rectify the alternating current output from the armature 24 and supply a D.C. current to the main generator field winding 16 which rotates concomitantly with the armature 24 of exciter 20.

Rectifier diodes 26 are mounted to rotate with the hollow rotor shaft 27 which supports the rotors of both the main generator and the exciter so that no brush, commutator or slip ring is required.

In accordance with one aspect of the present invention, the shaft 27 is hollow and the rectifier bridge circuit formed of diodes 26, which customarily is connected to be a three phase full wave rectifier or a three phase half wave rectifier as shown in U.S. Pat. No. 4,329,603, may be installed as a sub-assembly on a framework within a cylindrically shaped diode housing 30. The diode housing 30 is positioned between the exciter unit 20 and the field winding 16 of the main unit.

Figure 2:
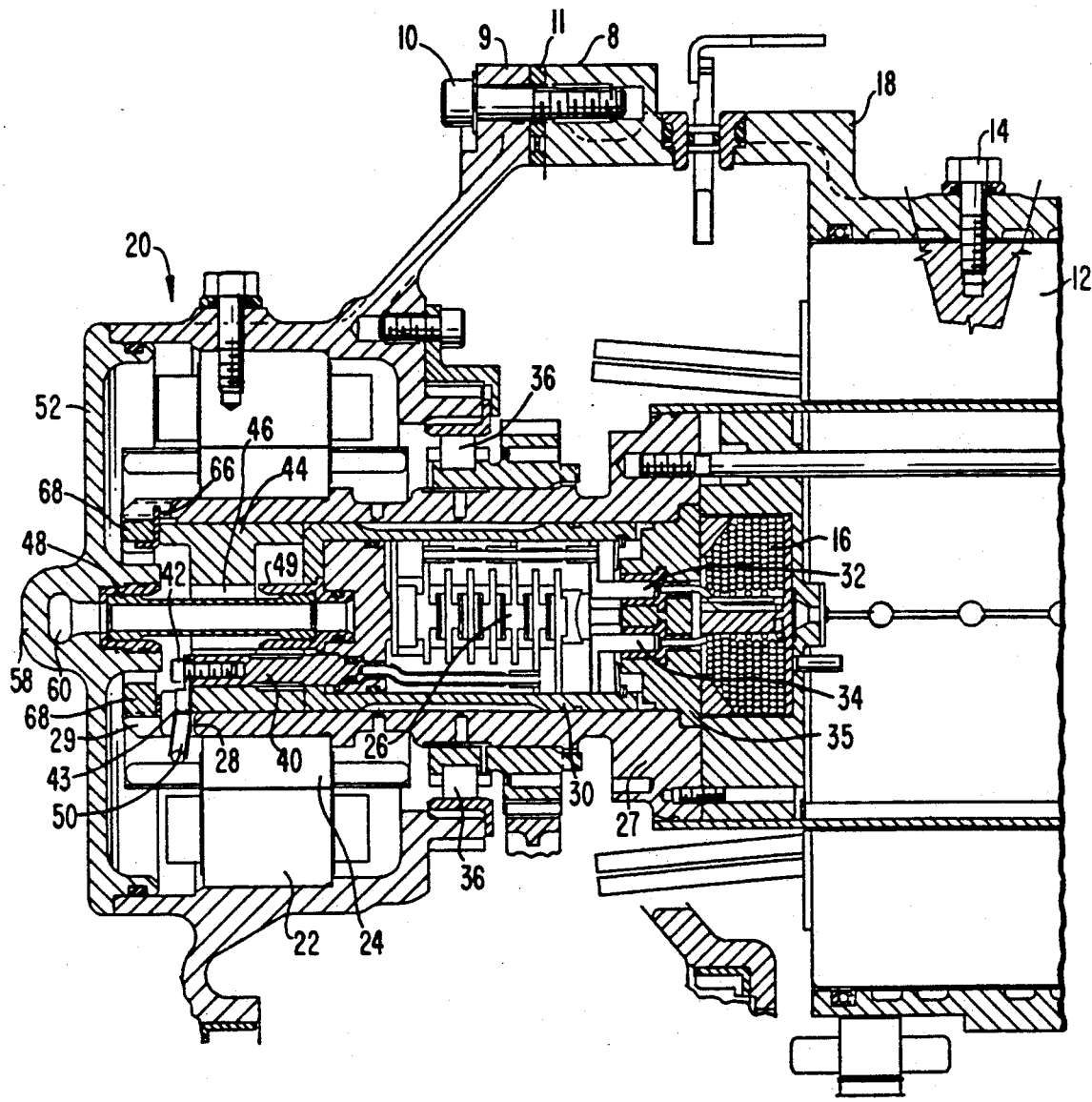
FIG. 2 is a view similar to FIG. 1 but of a smaller portion of the integrated drive generator showing the exciter unit, the rectifier assembly and a portion of the main generator unit to an enlarged scale.

In FIG. 2, the rectifier positive terminal pin 32 and negative at terminal pin 34 are shown as being received in sockets that are electrically connected to the main generator field winding 16 that rotates with shaft 27. The pins 32 and 34 are of a type which allow for easy separation from their respective sockets when the diode housing 30 is removed for servicing and for easy insertion when a diode housing 30 is replaced. The sockets are anchored to the rotor shaft 27 by socket support housing 35 to furnish firm positioning for the diode housing 30.

Hollow rotor shaft 27 is shown in FIG. 2 to be supported by rollers 36 forming a bearing located radially outwardly from the diode housing 30 and positioned in housing part 9. The opposite end of shaft 28 is supported by a bearing 38 in housing part 8 that is shown in FIG. 1. The end of the hollow rotor shaft 27 shown at the left side of FIGS. 1, 2 and 4 is, in accord with another feature of the invention, not supported outboard of the exciter 20 and thus the exciter is cantilever mounted outboard of the bearing rollers 36.

Figure 4:
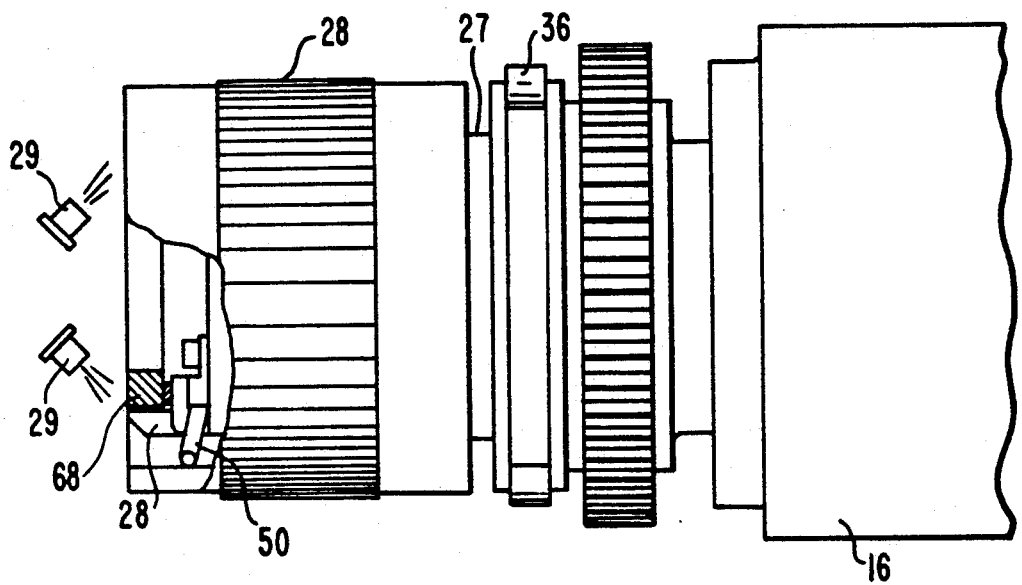
FIG. 4 is a schematic view of a portion of the dynamo shown in FIGS. 1–3 illustrating the central position of one bearing for the hollow rotor shaft and spray cooling of the exciter dynamo windings.

With reference to FIG. 4 the exciter rotor 28 is shown mounted at the end of the rotor shaft 27. Stationary coolant oil spray orifices 29 are mounted to provide more efficient cooling of the overhung exciter 20. The cooling efficiency is increased by positioning one or more stationary orifices 29 in a wall of a stationary housing part to direct cooling oil onto the inside surface at an outboard position of one end winding of the exciter. This produces a turbulent flow at the winding surface which will give better cooling than where the coolant flow is laminar.

Figure 3:
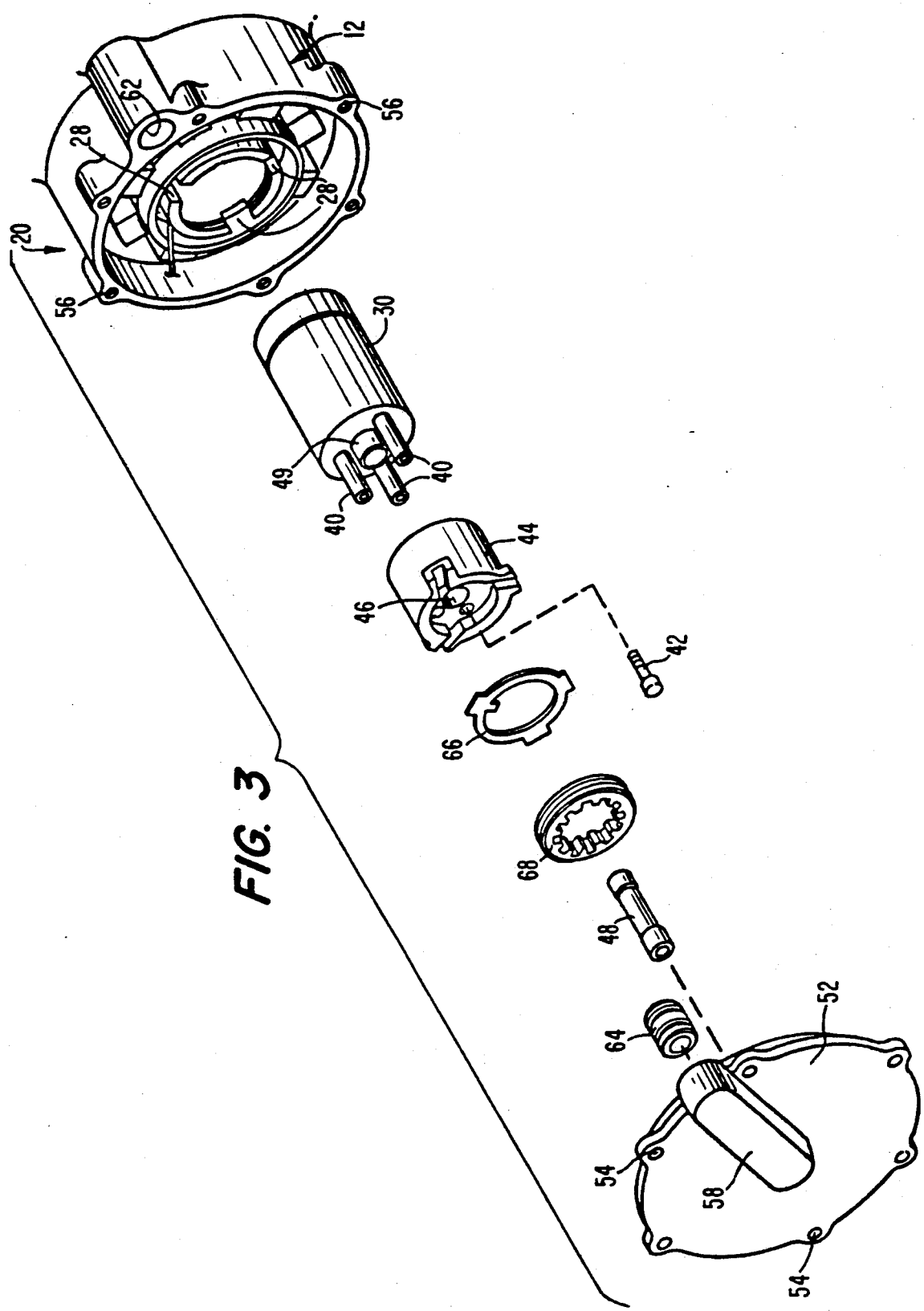
FIG. 3 is an exploded pictorial view showing the parts that removable along with the rectifier assembly and which are accessible under the cap shown at the left end of FIGS. 1 and 2.

With reference to FIGS. 2 and 3, diode housing 30 has three internally threaded terminals 40, one for each phase of the exciter armature 24, that receive respective externally threaded fasteners 42 which secure the ring tongue terminals 43 which are crimped to the exciter output leads 50 (see FIGS. 2 and 4) as part of the electrical connection between the respective exciter armature terminals and the input terminals to the diodes 26 in the diode housing 30. Each end wall of the diode housing 30 that is transverse to the rotational axis has a central aperture through which coolant is circulated. Manifold 44, through which fasteners 42 extend, has a central aperture 46 in transversely extending end walls through which a transfer tube 48 extends. The transfer tube 48 connects with a transfer support liner 49 for conveying coolant to the diodes in diode housing 30.

One important feature of the construction just described is that the wires 50 from the exciter armature 24 and connected to threaded terminals 40 are introduced into the interior of the rotor shaft 27 through slots 28 at an end 29 of the rotor shaft 27 rather than passing through holes in the walls of the rotor shaft 47. Where leads pass through holes in the walls as might be contemplated, impregnated lacing tape was required to secure the leads to the shaft adjacent to their entry into the shaft 27 from the exciter armature 24. Such a construction makes withdrawal of the rectifier assembly in diode housing 30 from the hollow shaft 27 difficult because of the need to cut securing ties and to pull the leads out of the rotor shaft 27 to leave the interior unrestricted. The hollow interior of shaft 27 must be free of wires so that diode housing 30 can be slid out from the open end of the rotor shaft 27.

By this feature of the present invention, the three leads 50 from the exciter armature 24 are passed directly into respective slots 28 at the open end 29 of the rotor shaft (see FIG. 3) and to the threaded terminals 40 (see FIG. 2). Disconnection and removal from the interior of the rotor shaft is easy without the need to cut or otherwise destroy any wire or wire securement structure. Reconnection of the wires 50 to terminal posts after replacement of the diode housing 30 does not require tape or impregnate. The wires 50 are secured by the close fit tolerance of the wire insulation and the three slots in the manifold 44 that are adjacent to the holes in the manifold into which the terminals 40 extend and receive the three threaded fasteners 42.

To gain access to the interior of the hollow rotor shaft where the diode housing is located, a cap 52 is provided. The end of the dynamo housing 9 near cap 52 is illustrated in FIG. 3 to have six holes 54 through which threaded fasteners (not shown) are received in the respective threaded holes 56 of the dynamo housing part 9.

The end face of cap 52 may be provided with a radially extending protrusion 58 which has a central duct 60 for coolant oil to be supplied to diode housing 30 through the open end of hollow rotor shaft 27 by means of the transfer tube 48. Coolant is supplied from duct 62 of housing part 9 to duct 60 as by means of a nipple 64. The stationary orifices 29 shown in FIG. 4 may be part of the interior surface of cap 52 and directly face the exciter windings to be cooled without an intervening rotor shaft bearing because of the placement of bearing 36 between the rotors of the exciter dynamo and the main dynamo.

One end of coolant transfer tube 40 passes thru the central aperture 46 of manifold 4 and into transfer tube support liner 49 and the other end of the transfer tube 48 fits into an aperture at the center of cap 52 to be in sealed fluid communication with duct 60. The distal end of diode housing 30 near terminal pins 32, 34 opens into the central hollow portion of the rotor shaft 28 upon which the main generator field winding 16 is positioned.

The manifold 44 is held in position on the diode housing 30 by tabbed washer 66 and externally threaded nut 68. Nut 68 is locked in position by means of a bendable tab on tabbed washer 66. The open end portion 29 of the hollow rotor shaft 27 is threaded to receive nut 68. Upon tightening nut 68, the parts are placed under compression against the sockets for pins 32 and 34 of the diode housing 30.

Removal of the diode housing 30 requires first the removal of cap 52 from housing section 9. Thereafter, the tabs on washer 66 are unbend and nut 68 is removed along with washer 66 to expose the wires 50 from the exciter armature 24. Removal of the three wires 50 from the three threaded terminals 40 allows easy removal of the manifold 44. Thereafter, the diode housing 30 is grasped and pins 32 and 34 extracted from their respective sockets.

It is thus apparent that the diode housing 30 can be removed without requiring separation of the dynamo housing portions 8 and 9 along split line 11. Also, it is apparent from the foregoing description that the rotor shaft and its bearings remain in place during this servicing procedure. Installation of diode housing 30 and replacement of cap 52 follows the reverse procedure. Cooling of the exciter is made more efficient by the positioning of the bearings 36 inboard of the exciter.

While only a single embodiment has been described, it is apparent that many changes and modifications may be made without departing from the spirit of the invention. It is therefore intended that all changes and equivalents falling within the scope of the appended claims be covered thereby.

We claim:

1. A brushless self-excited oil cooled dynamo electric machine comprising:
   a housing for said dynamo machine having a split line to divide the housing into different parts;
   a main dynamo unit mounted in said housing and having a rotating D.C. field producing structure mounted on a hollow rotor shaft connected to an oil coolant source, said main unit being energized by an exciter dynamo unit having a rotor mounted on the hollow shaft for producing an alternating current;
   means for rectifying the alternating current to a direct current for supplying current to said D.C. field including a plurality of diodes positioned on a diode framework, said diode framework having an outer periphery with a shape and size allowing sliding movement along said hollow rotor shaft to an open end thereof;
   a cap removably secured to one of said housing parts at a position to allow removal and insertion of said diode housing through the open end of said rotor shaft without separation of said dynamo housing parts along said split line;
   a plurality of connecting leads from the exciter positioned over an open end of the rotor shaft adjacent said cap and removably attached to terminals for said diodes;
   a main dynamo rotor having sockets aligned with said pins and fixedly positioned in the hollow rotor shaft for carrying direct current to said D.C. field producing structure, said pins being insertable in and removable from said sockets by sliding movement; and
   a threaded fastener engaging with a threaded inner surface of said hollow rotor shaft for securing said pins in said sockets; and wherein
   the diode framework is positioned in a housing which has opposite end walls with rigid pins extending from one end wall which is opposite the end wall facing said removable cap;
   the exciter unit is spaced from said main dynamo unit;
   the diode framework is positioned between said units; and
   the cap is located adjacent the exciter end of said hollow rotor shaft with the diode framework being removable along a path through a central portion of said exciter unit.

2. The machine as defined in claim 1 further comprising:
   a housing for said diode framework;
   a manifold positioned between the diode housing and the open end of said hollow rotor shaft, said manifold having a central through aperture;
   a transfer tube extending through said manifold central aperture between the diode housing and a cap coolant duct; and
   end walls on said diode housing lying transverse to the hollow rotor shaft axis and having openings for allowing coolant flow from said transfer tube toward said main dynamo unit.

3. The machine as defined in claim 2 wherein: the exciter unit is spaced from the main dynamo unit;
   the diode housing is operatively positioned between said units; and
   the cap is located adjacent the exciter end of said hollow rotor shaft so that the diode housing is removable along a path through a central portion of said exciter without removal of the rotor shaft from said housing.

4. A machine as defined in claim 1 further including:
   a bearing in each of said housing parts for supporting said hollow rotor shaft in the dynamo housing to permit removal of the diode housing from the hollow rotor shaft through an opening in one of said housing parts normally closed by said cap without removing the rotor shaft from said bearings and without removing said bearings from said housing.

5. A machine as defined in claim 4 wherein: the bearing in said one housing part is located between said main dynamo unit and said exciter dynamo unit so that an exciter dynamo rotor end is cantilever mounted outboard of the bearing in said one housing part.

6. The machine as defined in claim 5 further comprising a plurality of static orifices for spraying coolant oil on windings of said exciter dynamo, said orifices being positioned on the side of the exciter windings facing said cap.

7. A brushless self-excited oil cooled dynamo electric machine comprising:
   a main dynamo unit with a rotating D.C. field producing structure mounted on a hollow shaft connected to a coolant source, said main unit being energized by an exciter dynamo unit having a rotor mounted on the same hollow shaft for producing an alternating current;
   means for rectifying the alternating current to a direct current for supplying current to said D.C. field including a plurality of diodes positioned within a diode housing, said diode housing having an outer periphery with a shape and size allowing sliding movement along the rotor shaft to an open end thereof;
   leads extending from an exciter armature to said rectifying means over an open end of said hollow rotor shaft, said leads having end portions removably secured to terminals connected to alternating current receiving poles of said diodes so that a diode framework may be removed from said hollow shaft portion after removal of said leads without cutting or otherwise damaging said leads; and
   a cap removably attached to an exterior housing wall;

a machine housing part containing a coolant duct; and wherein said cap has a coolant duct having two ends, one end being aligned with said housing duct and the other end opening in a direction to provide coolant flow along the interior of said hollow rotor shaft toward the diode housing.

8. A brushless self-excited oil cooled dynamo electric machine comprising:

a housing for said dynamo machine having a split line to divide the housing into two different parts;

a main dynamo unit having a rotor mounted in a first of said housing parts and having a rotating D.C. field producing structure mounted on a hollow rotor shaft;

an exciter dynamo unit mounted in the second of said housing parts and having a rotor winding mounted on said hollow rotor shaft for producing a current supplied to the rotor of the main dynamo unit;

a first bearing for supporting said rotor shaft located outboard of the main dynamo field producing structure;

a second bearing for supporting said rotor shaft at a position between an exciter rotor winding and said main dynamo field producing structure with the exciter rotor being outboard of said second bearing;

a plurality of diodes mounted within said hollow shaft radially inwardly from said second bearing between said dynamo units; and a plurality of static orifices for spraying coolant oil on windings of said exciter dynamo, said orifices being positioned on a side of said dynamo machine; and insulated electrical wires extending from the rotor winding of said exciter dynamo over an open end of said hollow rotor shaft and to said diodes; and wherein the end of the hollow rotor shaft is slotted and said insulated wires are inserted in said slot, and a nut is threadedly receive on said slotted rotor end to prevent removal of said insulated wires without first removing said nut.

9. The machine as defined in claim 8 further including: insulated electrical wires extending from the rotor winding of said exciter dynamo over an open end of said hollow rotor shaft and to said diodes.

10. The machine as defined in claim 8 further comprising a cap removably secured to said second housing part at a position adjacent an open end of said hollow rotor shaft to allow removal of said nut and insulated wires and removal and insertion of said diodes through the open end of said shaft without separation of said dynamo housing parts along said split line.

11. A brushless self-excited oil cooled dynamo electric machine comprising:

a housing for said dynamo machine having a split line to divide the housing into different parts;

a main dynamo unit mounted in said housing and having a rotating D.C. field producing structure mounted on a hollow rotor shaft connected to an oil coolant source, said main unit being energized by an exciter dynamo unit having a rotor mounted on the hollow shaft for producing an alternating current;

means for rectifying the alternating current to a direct current for supplying current to said D.C. field including a plurality of diodes positioned on a diode framework, said diode framework having an outer periphery allowing sliding movement along said hollow rotor shaft to an open end thereof;

a cap removably secured to one of said housing parts at a position to allow removal and insertion of said diode housing through the open end of said rotor shaft without separation of said dynamo housing parts along said split line;

a machine housing part adjacent said cap containing a coolant duct; and wherein said cap has a coolant duct having two ends, one end being aligned with said housing duct and the other end opening in a direction to provide coolant flow along the interior of said hollow rotor shaft toward said diode framework.

12. A brushless self-excited oil cooled dynamo electric machine comprising:

a housing for said dynamo machine having a split line to divide the housing into two different parts;

a main dynamo unit having a rotor mounted in a first of said housing parts and having a rotating D.C. field producing structure mounted on a hollow rotor shaft;

an exciter dynamo unit mounted in the second of said housing parts and having a rotor winding mounted on said hollow rotor shaft for producing a current supplied to the rotor of the main dynamo unit;

a first bearing for supporting said rotor shaft located outboard of the main dynamo field producing structure;

a second bearing for supporting said rotor shaft at a position between an exciter rotor winding and said main dynamo field producing structure with the exciter rotor being outboard of said second bearing;

a plurality of diodes mounted within said hollow shaft radially inwardly from said second bearing between said dynamo units; and a plurality of static orifices for spraying coolant oil on windings of said exciter dynamo, said orifices being positioned on a side of said dynamo machine;

a machine housing part adjacent said cap containing a coolant duct; and wherein said cap has a coolant duct having two ends, one end being aligned with said housing duct and the other end opening in a direction to provide coolant flow along the interior of said hollow rotor shaft toward the plurality of diodes.

* * * * *